United States Patent
Bischof et al.

(10) Patent No.: US 6,694,370 B1
(45) Date of Patent: Feb. 17, 2004

(54) COMPUTERIZED METHOD AND SYSTEM FOR IMPLEMENTING DISTRIBUTED APPLICATIONS

(75) Inventors: Joerg Bischof, Zurich (CH); Stefan G. Hild, Adliswil (CH); Marcus Oestreicher, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/509,852

(22) PCT Filed: Jul. 29, 1999

(86) PCT No.: PCT/IB99/01347

§ 371 (c)(1),
(2), (4) Date: Aug. 18, 2000

(87) PCT Pub. No.: WO00/08557

PCT Pub. Date: Feb. 17, 2000

(30) Foreign Application Priority Data

Aug. 1, 2000 (EP) .............................. 98114506

(51) Int. Cl.$^7$ ................................ G06F 15/16
(52) U.S. Cl. .................... 709/229; 709/317
(58) Field of Search .................. 709/202, 203, 709/200, 201, 220–229, 315–317

(56) References Cited

U.S. PATENT DOCUMENTS

| | | | |
|---|---|---|---|
| 5,603,031 A | 2/1997 | White et al. ............ 709/317 |
| 6,009,456 A | * 12/1999 | Frew et al. ................. 709/202 |
| 6,055,562 A | * 4/2000 | Devarakonda et al. ...... 709/202 |
| 6,065,039 A | * 5/2000 | Paciorek ..................... 709/202 |
| 6,144,989 A | * 11/2000 | Hodjat et al. ............... 709/202 |
| 6,148,327 A | * 11/2000 | Whitebread et al. ........ 709/202 |
| 6,172,986 B1 | * 1/2001 | Watanuki et al. ........... 370/466 |
| 6,219,696 B1 | * 4/2001 | Wynblatt et al. ........... 709/218 |
| 6,460,070 B1 | * 10/2002 | Turek et al. ................ 709/202 |
| 6,466,963 B1 | * 10/2002 | Shigemori .................. 709/202 |
| 6,594,684 B1 | * 7/2003 | Hodjat et al. ............... 709/202 |

FOREIGN PATENT DOCUMENTS

| | | | |
|---|---|---|---|
| AT | 7216494 A | 6/1995 | |
| EP | 0 634 719 A | 1/1995 | ............ G06F/9/64 |
| JP | 7182174 A | 7/1995 | |
| JP | 7509799 T | 10/1995 | |
| WO | WO 9502219 A | 1/1995 | |

OTHER PUBLICATIONS

H. Peine, "An introduction to mobile agent programming and the Ara system", ZRI–Report, 1997, pp. 1–67, XP002124596 University of Kaiserslautern, Germany.

* cited by examiner

*Primary Examiner*—St. John Courtenay, III
(74) *Attorney, Agent, or Firm*—Louis P Herzberg

(57) ABSTRACT

A computerized method and a system for implementing in a network distributed applications, comprising instructions for a computer process which are executable on different locations in the network, is proposed. The instructions include an assert-command and/or a release-command.

10 Claims, 1 Drawing Sheet

COMPUTERIZED METHOD AND SYSTEM FOR IMPLEMENTING DISTRIBUTED APPLICATIONS

TECHNICAL FIELD

The present invention is related to a method and system for implementing distributed applications in a computer network. In general, the applications are executable on any location in the network.

BACKGROUND OF THE INVENTION

Computers and devices are connected via networks where applications are being processed and executed. Different architectures and programming languages for their operation are known. Conventional programming languages such as Pascal, C, or Java, do not provide any standard means for identifying location requirements. In classical distributed computer applications such dependencies are identified by the application programmer who splits the overall application into integral parts, such as 'client' and 'server', programs these parts separately and installs them at a required position or on a required device. Communications between those parts is provided by either message-passing, remote procedure calls or, in the case of object-oriented programming languages, by remote method invocations.

Agent-technology or mobile code programming has recently introduced another method for realizing distributed systems. The need for developing the overall application in separate parts has been removed, and replaced by simple language primitives, such as the 'GO' command, which move the application in its entirety to another location. It has been shown that this simplifies the programming of such applications since the application can be written with a single flow of control.

U.S. Pat. No. 5,603,031 describes a system and a method for distributed computation based upon the movement, execution, and interaction of processes in a network. An agent process controls its movement from one place process to another within the network by using a ticket and sends clones of the agent process to several place processes simultaneously.

This simple programming model which is used for common systems has a number of limitations. First, while a single flow of control allows simple design and implementation, it is too rigid to allow for optimizations such as the exploitation of parallelism at run-time. Further, the structure prescribes a fixed location-dependency; if the requested location is unavailable, the execution of an application must halt. This is negative since it is common that for most portions of the programming code the location at which they are executed is irrelevant. Furthermore, the simple 'GO' primitive is only usable to indicate location dependencies, and the point at which a 'GO' must be executed must be defined at compile-time.

OBJECT AND ADVANTAGES OF THE INVENTION

It is an object of the present invention to provide a method and system for implementing distributed applications in a network.

It is another object of the present invention to provide more location flexibility for networks.

It is a further object of the present invention to provide a simple method for the execution of distributed applications in a network.

It is still a further object of the present invention to optimize the processes in a network.

The method and system for implementing distributed applications in a network according to claim 1 and claim 9 shows the advantage that more efficiency can be obtained, because only the necessary parts of an application are transferred and executed on relevant and suitable locations, and those should only be transferred when necessary. This optimizes transferring-, connecting- and processing-times, which implicitly reduces costs. Furthermore, the method provides enough flexibility to a runtime system to allow more freedom of action, i.e. flexible and efficient execution, and is thus a remedy to the rigid structure demanded by conventional agent-programming or mobile code. Such efficiency and flexibility cannot be achieved by conventional methods of distributed-application programming, such as client/server or traditional agent system. It is therefore an object of the invention to overcome the problems of the state of the art.

In the dependent claims various modifications of and improvements to the method for implementing distributed applications are contained.

When a location is identified by giving a location identifier which comprises for the location its definite position or a functionality required for execution at the location or a parameter which from available parameters is to be chosen optimal for the execution at the location or by giving an address where to find said location identifier, then the advantage occurs that the proposed method allows a wide range of location identification possibilities. The address of a location where to execute an application is hence no longer bound to a fixed position, but the choice of a location is herewith rendered more flexible.

The present invention makes use of additional instructions, which include an assert-command which can be used wherever it is to be effected that the subsequent instructions are executed at an identified location. No other command for the execution on another location is needed, which guarantees for simplicity, uniformity and correct execution. The 'GO' command becomes unnecessary, which is an advantage for future developments and applications.

When the instructions of an application includes different assert-conmmands, such as ASSERT, INSIST and PREFERRED, then the advantage occurs that the applications get more flexibility and freedom of action. In case of non-availability of a location for the execution of the application, a first assert-commnand type (ASSERT) indicates a location and the programs willingness to suspend its execution temporarily. A second assert-command type (INSIST), on the other hand, might terminate the application in such instances. Therefore, the process of the application doesn't wait but rather aborts execution. A third assert-command type (PREFERRED) continues by executing the subsequent instructions at the previously used location, which has the advantage that the application carries on, even though the preferred is currently unavailable. Several assert-command types are creatable and usable for distributed applications, which shows the flexibility and adaptability of the inventive method for distributed applications in a network.

The assert-command types can point to identified locations of different locations, whereby the identified locations are choosable "ad libitum", which means that the identified locations are selectable without any preferences, or in the other case, the identified locations are arrangable and selectable in a predetermined preference-ordered sequence, which gives much room and flexibility to move an application. The execution of an application and the processes in a network can therewith be optimized and adapted.

A runtime system is usable to move the applications to identified locations in a network and executes the instructions. In the case of a release-command the choice of a location whereto the application is moved, is then dependent on system- and/or state conditions. This provides more freedom of action for the runtime system, which is now able to use the available resources of the network.

SUMMARY OF THE INVENTION

The invention provides a general and flexible method and system for implementing a distributed application in a network.

The present invention for implementing a distributed application in a network describes a method and system which allow the temporary assertion of position-, device- or service-dependencies and can be used in applications to describe the required location behavior abstractly and in an intuitive manner. Instructions for a computer process which are executable on different locations in the network comprising an assert-command and/or a release-command. The assert-command points to an identified location of the different locations, which effects that its subsequent instructions are to be executed at the identified location. The release-command effects that the execution of its subsequent instructions is not bound to an identified location.

The problem from the state of the art that more than one location has to be used from one application is still considered valid, whereby the positions, devices or services are not fixed according to an allocated address and even the swap times, i.e. when an application moves to another location, are not predetermined.

DESCRIPTION OF THE DRAWINGS

The invention is described in detail below with reference to the following schematic drawings.

Figure 1:
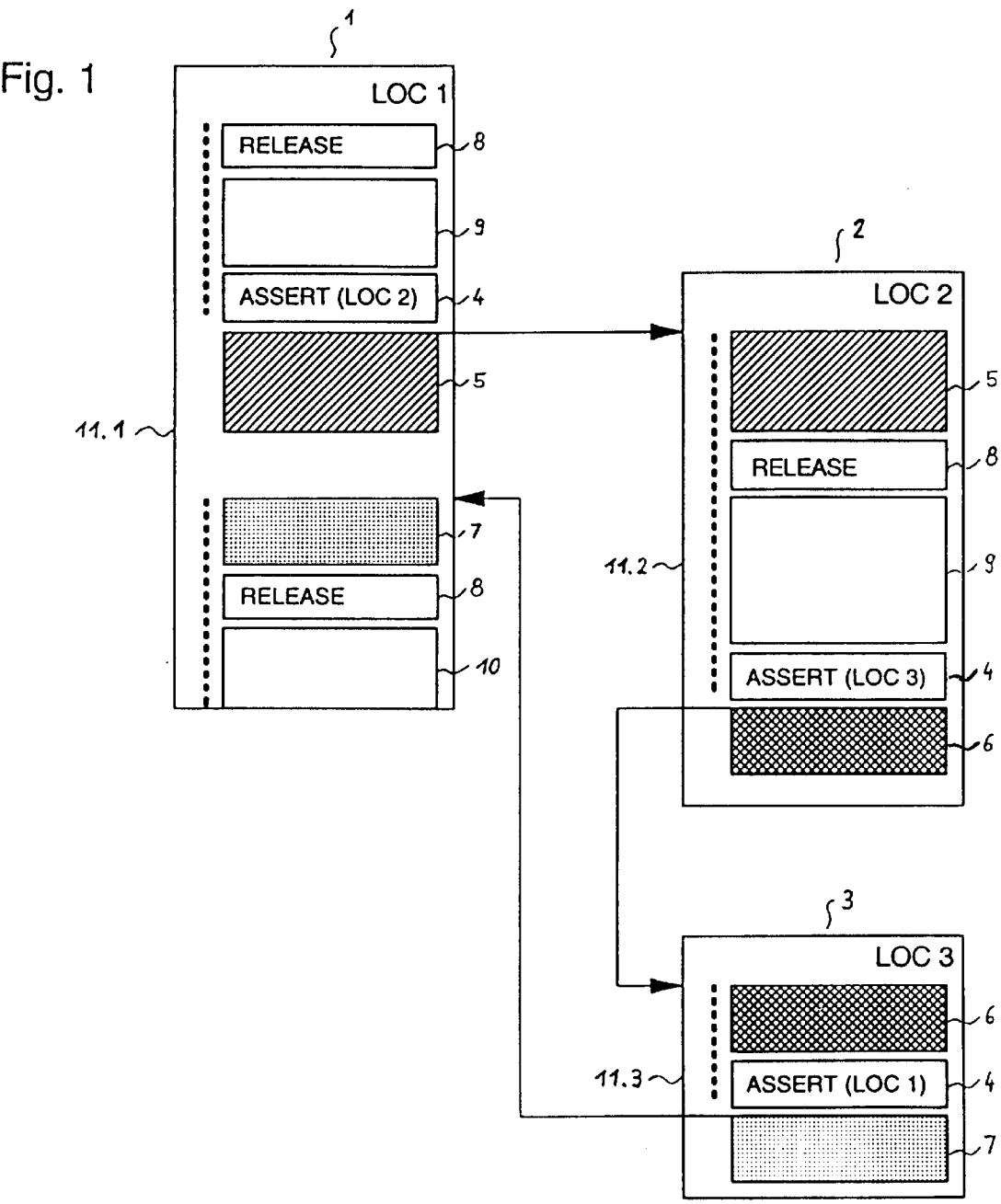
FIG. 1 shows a schematic diagram of an application according to the present invention.

All the figures are for the sake of clarity not shown in real dimensions, nor are the relations between the dimensions shown in a realistic scale.

DETAILED DESCRIPTION OF THE INVENTION

In the following, the various exemplary embodiments of the invention are described.

Herewith are introduced two command primitives which either assert the availability or presence of a position, device or service, or release a previously made assertion. For illustration purposes, these primitives are herein called 'ASSERT' and 'RELEASE'. The primitives may be called against either positions of type 'POSITION' or devices of type 'DEVICE' or services of type 'SERVICE'. The semantics of the primitives can be summarized as follows:

- a location ASSERT determines that the instructions following the ASSERT call must be executed at the asserted location,
- a location RELEASE indicates that the instructions following the RELEASE call might be executed on any place.

Furthermore, other primitives can be provided, for example:

- a location PREFERRED indicates that the instructions following the PREFERRED call are preferably executed at a preferred location, or
- a location PROXIMITY indicates that physical or network proximity to a given location is required, or
- a location LOAD indicates that a location where a minimum load is present is required, or
- a location SPEED indicates that a location with special processing time or speed is required, or
- a location SECURITY indicates that a connection to a given location in a safe manner is required.

Depending on the requirements, many more primitives can be created and provided. The semantics of the primitives is therefore freely chooseable.

A location is identified by giving a location identifier which comprises for the location its definite position or a functionality required for execution at the location or a parameter which from available parameters is to be chosen optimal for the execution at the location or by giving an address where to find the location identifier. A definite position for a server, device or service may be known, this makes the addressing and the finding of a location in a network simple.

Also a functionality can be required by the user, by the system or by the application. It can be required a special device or a device with a feature or even a service, like printing. A CD-player with random play or a special mathematics processor may be required for the execution and therefore described by the functionality, which then is to be found in a network.

A location can also be identified by a location identifier which comprises a parameter, for instance by a parameter like LOAD, SPEED or SECURITY which are mentioned above. The system may be designed that it is able to choose by itself for a parameter the optimal value or value-range for the execution in that it follows predetermined rules, e.g. representing a behavior which can be assumed to be desired. For instance, when the load on a location should be low, the parameter LOAD is therefor chosen to be optimized for the execution. Naturally, a low load is desired which the runtime system might have implemented as automatic preferred direction of optimization. Alternatively the preferred direction can be given by a programmer, user or the like. It is a natural goal to be able to do things quickly. The speed can therefor be chosen as fast as possible to be optimal for the application's requirements and the user's needs. The parameter is hence SPEED and the runtime system will automatically tend to find a location with the highest processing speed value. As example is given:

LOCATION v=LOCATION (SPEED, min 50), whereby the parameter SPEED is introduced to the runtime system which hence seeks access to a location with maximum processing speed or at least processing speed value 50. For the security, a special certificate or a security-level might be chosen in a range to be optimal for the execution. The security-level may also correspond to an issuing authority. An example with the parameter SECURITY for a location which requires a security-level "3" is given by LOCATION sl=LOCATION (SECURITY, "3")

and for a location which needs a special issuing authority

LOCATION sa=LOCATION (SECURITY, "VISA")

can be used.

In the following examples, the used primitives are called 'ASSERT' and 'RELEASE'. For the illustration, a simple self-explaining syntax is used within the following code segment:

//Code Block A
[1] LOCATION a=LOCATION (POSITION, "piot.zurich.ibm.com");
[2] a.ASSERT ( );
//Code Block B
[3] a.RELEASE ( );
//Code Block C In the above example, a location assertion and release is embedded within three Code Blocks termed A, B, C. The handling of these calls can be implemented either at compile time or preferably at run time, as assumed in the following.

At code line [1], a particular machine location is defined. For example, the runtime system verifies the existence of the desired location or establishes a communication link in preparation for any communication tasks which could reasonably be expected.

At code line [2], the previously defined location is asserted by ASSERT. The runtime system interprets now the requirement that, the following instruction lines (Code Block B) are to be executed at the asserted position "piot.zurich.ibm.com".

At code line [3], the location constraint is being released. This is the indication to the runtime system that Code Block C is not bound to the previously asserted location. Hence, the runtime system is now free to move the application and execute the instructions following the RELEASE to any other location.

Similarly, the same primitives might be executed against device descriptions such as in the second example, whereby a functionality herein is expressed as device:

[5] LOCATION d=LOCATION (FUNCTIONALITY, "mpeg_player");
[6] d.ASSERT ( );
//Code Block F
[7] d.RELEASE ( );

The example indicates that a functionality respectively a device in code line [5] with location identifier "mpeg_player" has to be available at the location d. At code line [6], the previously defined location d is asserted by ASSERT. The runtime system interprets then the requirement that the following instruction lines, which start here with Code Block F, are to be executed at the asserted location d identified by location identifier "mpeg_player". At code line [7], the location constraint respectively device constraint is being released. This is the indication to the runtime system that the following instruction lines are not bound to the previously asserted location.

Feedback might be provided by such primitives to an application to allow reasonable abort-modes. An ASSERT may imply a RELEASE of a previously asserted location.

Referring now to FIG. 1, which shows a general schematic diagram of an application (11.1, 11.2, 11.3), which is respectively executed on location 1, 2 and 3, further details are described according to the processing of the application (11.1, 11.2, 11.3) depicted by a dotted line and arrows. The schematic diagram starts on the top of the left box on location 1 with RELEASE 8 as a release-command. This release-command RELEASE 8 effects that the execution of the subsequent instructions 9 depicted as block 9 are not bound to an identified location. It is therefore then possible for the runtime system to move the application 11.1 to a further location, like location 2 or 3, or carry on with the execution of the application 11.1 on location 1, as depicted in the left box. The vertical dotted line shows the processing of the application 11.1. An assert-command ASSERT (LOC 2) 4 following block 9 in application 11.1 denotes the latest instance when the application 11.1 must be moved by the runtime system to location 2 to ensure subsequent instruction lines following the ASSERT (LOC 2) 4 command are being executed at location 2. The runtime system interprets then the requirement that the instructions following at the beginning of block 5 have to be executed at the asserted location 2 and no longer at location 1. The arrow from location 1 to location 2 shows the latest possibility for the runtime system to move the application 11.1 to location 2. The vertical dotted line on the left side of the right box shows also the processing of the application 11.2, which is then situated and executed on location 2. Followed by another RELEASE 8, the instructions of block 9 from application 11.2 on location 2 are not location-dependent, which means that the application 11.2 might be executed on another location than location 2. With the following assert-command ASSERT (LOC 3) 4 the application 11.2 is then moved by the runtime system to location 3 (depicted by the arrow from location 2 to location 3), where the application 11.3 according to the instructions of the block 6 is executed. Block 6 has to be executed on the asserted location 3, which is indicated by ASSERT (LOC 3) 4. Furthermore, the application 11.3 which includes block 7, asserted by ASSERT (LOC 1) 4, has to be moved (depicted by the arrow from location 3 to location 1) and executed on the asserted location 1. The following release-command RELEASE 8 on location 1, depicted at the bottom of the left box, effects that the execution of the application 11.1 by its subsequent instructions, depicted as block 10, is released and not bound to an identified location. Here, the application 11.1 is further executed on location 1. In these last descriptions the term "has to be moved" refers to the latest possible point in time when the runtime system has to migrate the application. Earlier migration is possible, but not before the previous RELEASE command.

Figure 2:
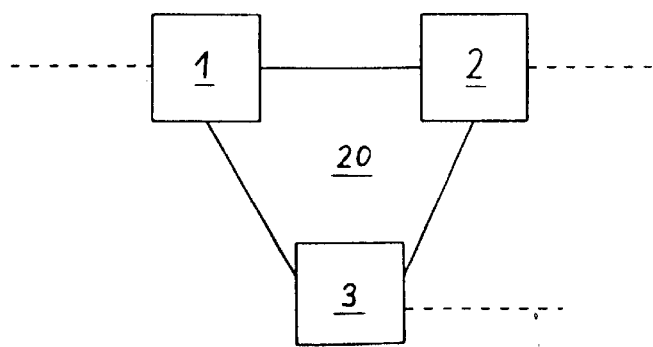
FIG. 2 shows a schematic illustration of a network with different locations and connections.

FIG. 2 shows a schematic illustration of a network 20 with different locations and connections for a better understanding of FIG. 1. The boxes represent respectively a location 1, a location 2 and a location 3 corresponding to the locations 1, 2, 3 of FIG. 1.

The locations 1, 2, 3 are connected and might have further connections indicated by the dotted lines.

Two characteristic examples with self-explaining instruction codes are addressed in the following.

EXAMPLE I

Remote DB Access

The following example "Remote DB (database) Access" demonstrates dynamic adaptation of a runtime environment which leads to improved code efficiency and flexibility and is concerned with an application on a client machine interacting with a remote database server. In conventional client/server systems, the client part would implement a user interface on a local client machine, whereas the server component would reside with the database remotely. The client might be implemented as follows:

Print "Name?"
Input user_name
Contact Server
Request server to verify user_name with regard to DB
if (server reports that user_name is already entered in DB)
terminate
else Print "Address?"
Input address
...

The server code (not shown) is developed separately. Agent-based systems improve this by allowing the application to be developed as a single thread of execution. An agent implementation with the same function like in the previous example might be implemented as:

Print "Name?"
Input user_name
GO DB_server
Check user_name with regard to now local DB
if (user_name is already entered in DB)
    terminate
else
    GO client_machine
    Print "Address?"
    Input address
...

In both the client/server methodology and the agent-based approach it must be decided a-priori that the check of the user's name with regard to the database is to be performed. If the client's networking environment is such that communications with the database server might be temporarily unavailable, it could be advantageous to skip the verification process and/or tolerate the inconvenience of entering address data twice. Making the client/server code to adjust its behavior dynamically would require low-level access to the communications and networking subsystem which are not only cumbersome to include in the application code but also hamper the application's portability and maintainability. The GO command is too rigid and inflexible to allow any adaptability.

Using the primitives 'ASSERT' and 'RELEASE', the task is solved by allowing the runtime system to adapt to the environment, such as:

LOCATION clientloc=new LOCATION ("Client machine");
LOCATION dbloc=new LOCATION ("DB machine");
clientloc.ASSERT ( );
Print "Name?"
Input user_name;
clientloc.RELEASE ( );
if (dbloc.PREFERRED ( )==GRANTED)
    Check user_name with regard to DB
    dbloc.RELEASE ( );
    If (user_name is already entered in DB)
        terminate
clientloc.ASSERT ( );
Print "Address?"
Input address
clientloc.RELEASE ( );

Since the instructions are given in their full syntax, the code appears here longer than in the previous examples. However, the runtime system is free to relocate the code from the client's machine to the preferred database location if this is achievable given the current connectivity state of the client.

EXAMPLE II

A Distributed CD Player

The next example "A Distributed CD Player" demonstrates the ability of a runtime system to dynamically relocate the execution location of a single application to permit access to required services or required locations, while to perform computationally complex operations at machines that are only lightly loaded or have specialized hardware that make them particularly suited for the tasks of the applications. The following application implements a music-CD player:

[20] LOCATION cd=new LOCATION (SERVICE, "CLASSIC CD MOZART");
[21] cd.ASSERT ( );
    //read soundtrack
[22] cd.RELEASE ( );
    //decode soundtrack
[23] LOCATION loc=LOCATION (POSITION "my machine");
[24] loc.ASSERT ( );
    //play soundtrack
[25] loc.RELEASE ( );

In this example, the application demands that the runtime system locates an available server that is willing to offer a particular CD as a service, like the requested CD in code line [20]. The defined location is asserted by ASSERT at code line [21]. Once the runtime system has access to the respectively location, the next instruction is executed which reads the soundtrack of the CD. After this process is finished, the application indicates to the runtime system that the service is no longer required. The application then starts decoding the soundtrack, a computationally expensive task. Although the application has not demanded so, the runtime system is now free to move the application to another location (host) and continue execution there at any time it decides to do so. The RELEASE primitive at code line [22] has indicated that no particular location is required, but does not indicate when or if at all the code has to be moved, it merely indicates the 'earliest time' when a relocation 'may' happen. Once decoding is completed, the application indicates that it wishes to play the soundtrack at a particular machine, like on "my machine" now described in code line [23], and the runtime system is requested to grant this demand. The ASSERT primitive in code line [24] does not indicate when the code has to be relocated to the indicated machine, merely the 'latest time' when this 'must' be done. With the RELEASE primitive at code line [25] the location constraint is being released.

What is claimed is:

1. A computerized method for implementing in a network (20) a distributed application (11.1, 11.2, 11.3) comprising instructions for a computer process which are executable on different locations (1, 2, 3) in said network (20), said instructions including:
   an assert-command (4) pointing to an identified location (2, 3, 1) of said different locations (1, 2, 3), which command effects that its subsequent instructions (5, 6, 7) are to be executed at said identified location (2, 3, 1); and/or
   a release-command (8), which effects that the execution of its subsequent instructions (9, 10) is not bound to any of said locations (1, 2, 3).

2. The computerized method according to claim 1, wherein the location (1, 2, 3) is identified by giving a location identifier which comprises of said location (1, 2, 3) its definite position or a functionality required for execution at said location (1, 2, 3) or a parameter whose value is to be chosen optimal for said execution at said location (1, 2, 3) or by giving an address where to find said location identifier.

3. The computerized method according to claim 1, wherein the instructions include the assert-command (4), whereby said assert-command (4) is used wherever it is to be effected that its subsequent instructions (5, 6, 7) are executed at the identified location (2, 3, 1).

4. The computerized method according to claim 1, wherein the instructions include the assert-command (4), whereby in case of non-availability of the location (1, 2, 3) for the execution, the application does not continue, which realizes a first assert-command type (ASSERT), or suspends, which realizes a second assert-command type (INSIST), or continues by executing the subsequent instructions at the previously used location, which realizes a third assert-command type (PREFERRED).

5. The computerized method according to claim 4, wherein several of the assert-command types are used in the application (11.1, 11.2, 11.3).

6. The computerized method according to claim 4, wherein the assert-command (4) points to at least one another identified location (2, 3, 1) of the different locations (1, 2, 3) and that either one of said pointed-to identified locations (2, 3, 1) is choosable ad libitum or that said identified locations (2, 3, 1) are arranged in a predetermined preference-ordered sequence.

7. The computerized method according to claim 1, wherein a runtime system in the case of the assert-command (4) moves the application (11.1, 11.2, 11.3) or parts thereof to the identified location (2, 3, 1) and/or in the case of the release-command (8) leaves the choice of the location (1, 2, 3) whereto said application (11.1, 11.2, 11.3) is moved, to at least one system- and/or state-dependent condition, and, having said application (11.1, 11.2, 11.3) at said identified location (2, 3, 1) or chosen location (2, 3, 1) executes the instructions.

8. The computerized method according to claim 1, wherein said instructions (4–10) are Java-based.

9. A system for implementing in a network (20) distributed applications (11.1, 11.2, 11.3) with instructions of a computer process which are executable on different locations (1, 2, 3) in said network (20), comprising at each location:
- a processor for executing said instructions;
- a memory unit coupled to said processor, for storing said instructions;
- an interface of said processor to said network;
- a runtime system, managing the execution of said instructions; which include:
  a. an assert-command (4) pointing to an identified location (2, 3, 1) of said different locations (1, 2, 3), which command effects that its subsequent instructions (5, 6, 7) are to be executed at said identified location (2, 3, 1); and/or
  b. a release-command (8), which effects that the execution of its subsequent instructions (9, 10) is not bound to any of said locations (1, 2, 3).

10. A computer-readable medium encoded with a computerized method of implementing in a network (20) distributed applications (11.1, 11.2, 11.3), comprising instructions for a computer process which are executable on different locations (1, 2, 3) in said network (20), the method improving the location flexibility in said network (20) in that said instructions include:
- an assert-command (8) pointing to an identified location (2, 3, 1) of said different locations (1, 2, 3), which command effects that its subsequent instructions (5, 6, 7) are to be executed at said identified location (2, 3, 1); and/or
- a release-command (8), which effects that the execution of its subsequent instructions (9, 10) is not bound to any of said locations (1, 2, 3).

* * * * *